United States Patent
Pikesh et al.

[11] Patent Number: 6,004,382
[45] Date of Patent: Dec. 21, 1999

[54] AIR CLEANING SYSTEM FOR VEHICLE COOLING SYSTEM AND ENGINE AND CAB

[75] Inventors: Derryn W. Pikesh, Davenport, Iowa; Lawrence M. Sobol, Hinsdale, Ill.

[73] Assignee: Case Corporation, Racine, Wis.

[21] Appl. No.: 09/027,315

[22] Filed: Feb. 20, 1998

[51] Int. Cl.⁶ ..................................................... B01D 45/14
[52] U.S. Cl. ........................... 95/270; 55/385.3; 55/403; 55/406; 55/413; 55/DIG. 14
[58] Field of Search ............................. 55/306, 317, 342, 55/345, 343, 385.3, 410, 410.1, 413, 403, 406, 407, 408, 409, DIG. 14; 123/198 E; 95/270

[56] References Cited

U.S. PATENT DOCUMENTS

| | | |
|---|---|---|
| 2,991,844 | 7/1961 | Nomar ...................................... 55/403 |
| 3,584,439 | 6/1971 | Gronholz . |
| 3,630,003 | 12/1971 | Ashton et al. . |
| 3,641,744 | 2/1972 | Culbert et al. . |
| 3,720,045 | 3/1973 | Murphy . |
| 3,802,169 | 4/1974 | Mugford . |
| 3,837,149 | 9/1974 | West et al. . |
| 3,838,675 | 10/1974 | Schaeffer . |
| 3,847,577 | 11/1974 | Hansen . |
| 3,925,044 | 12/1975 | Tu et al. . |
| 3,983,796 | 10/1976 | Ahlrich ..................................... 55/406 |
| 3,993,463 | 11/1976 | Barr . |
| 4,014,673 | 3/1977 | Kinnison . |
| 4,157,902 | 6/1979 | Tokar . |
| 4,162,906 | 7/1979 | Sullivan et al. . |
| 4,190,217 | 2/1980 | O'Connor . |
| 4,218,223 | 8/1980 | Lidstone et al. . |
| 4,236,901 | 12/1980 | Kato et al. . |
| 4,248,613 | 2/1981 | Linhart . |
| 4,249,922 | 2/1981 | Saele . |
| 4,261,710 | 4/1981 | Sullivan . |
| 4,303,423 | 12/1981 | Camplin et al. . |
| 4,314,832 | 2/1982 | Fox . |
| 4,396,407 | 8/1983 | Reese . |
| 4,482,365 | 11/1984 | Roach . |
| 4,514,193 | 4/1985 | Booth . |
| 4,606,743 | 8/1986 | Shuman . |
| 4,746,340 | 5/1988 | Durre et al. . |
| 4,790,864 | 12/1988 | Kostun . |
| 4,861,359 | 8/1989 | Tettman . |
| 5,199,963 | 4/1993 | Scarp . |
| 5,277,157 | 1/1994 | Teich . |
| 5,401,285 | 3/1995 | Gillingham et al. . |
| 5,472,463 | 12/1995 | Herman et al. ......................... 55/385.3 |
| 5,575,826 | 11/1996 | Gillingham et al. . |
| 5,595,537 | 1/1997 | Jungemann et al. . |
| 5,618,323 | 4/1997 | Shearn et al. ........................... 55/385.3 |
| 5,683,479 | 11/1997 | Gillingham et al. . |

OTHER PUBLICATIONS

Brochure for Donaldson's Intertial Separators Donaclone® & Strata entitled "Pre–Cleaners for Heavy–Duty Applications" Highly Effective, No Moving Parts, Low Maintenance, (Donaldson, Undated, p. 109).

Brochure for Donaldson's STB Strata® for Heavy Dust Conditions entitled "The All–in–One STB Strata® System" Pre–Cleaner, Air Cleaner and Scavenge System (Donaldson, Undated, pp. 111–112).

Brochure for Donaldson's Donaspin™ For Off–Road Applications entitled "Donaspin™ Pre–Cleaner" Extends Filter Life in Extremely Heavy Dust Conditions, (Donaldson, Undated, p. 173).

Advertisment for Focus Process & Plant, It's so simple entitled "Centrifugal impeller removes the most dust", (NKG Technology Ltd., Undated, 1 pg.).

Article entitled "Particle Filtration" (Filtration & Separation, May 1997, pp. 337 & 339).

*Primary Examiner*—David A. Simmons
*Assistant Examiner*—Robert A. Hopkins
*Attorney, Agent, or Firm*—Richard G. Lione; Brinks Hofer Gilson & Lione

[57] ABSTRACT

An air cleaning system for a vehicle includes an inertial separator for filtering contaminated air, which then enters a vehicle cooling system positioned to receive the filtered air exiting from the inertial separator, and a clean air diverter positioned to receive a portion of the filtered air and to direct the filtered air to an engine and/or cab. The system may also include a pulley arrangement to increase the speed of a second inertial separator which further filters the air directed to the engine and/or cab.

17 Claims, 2 Drawing Sheets

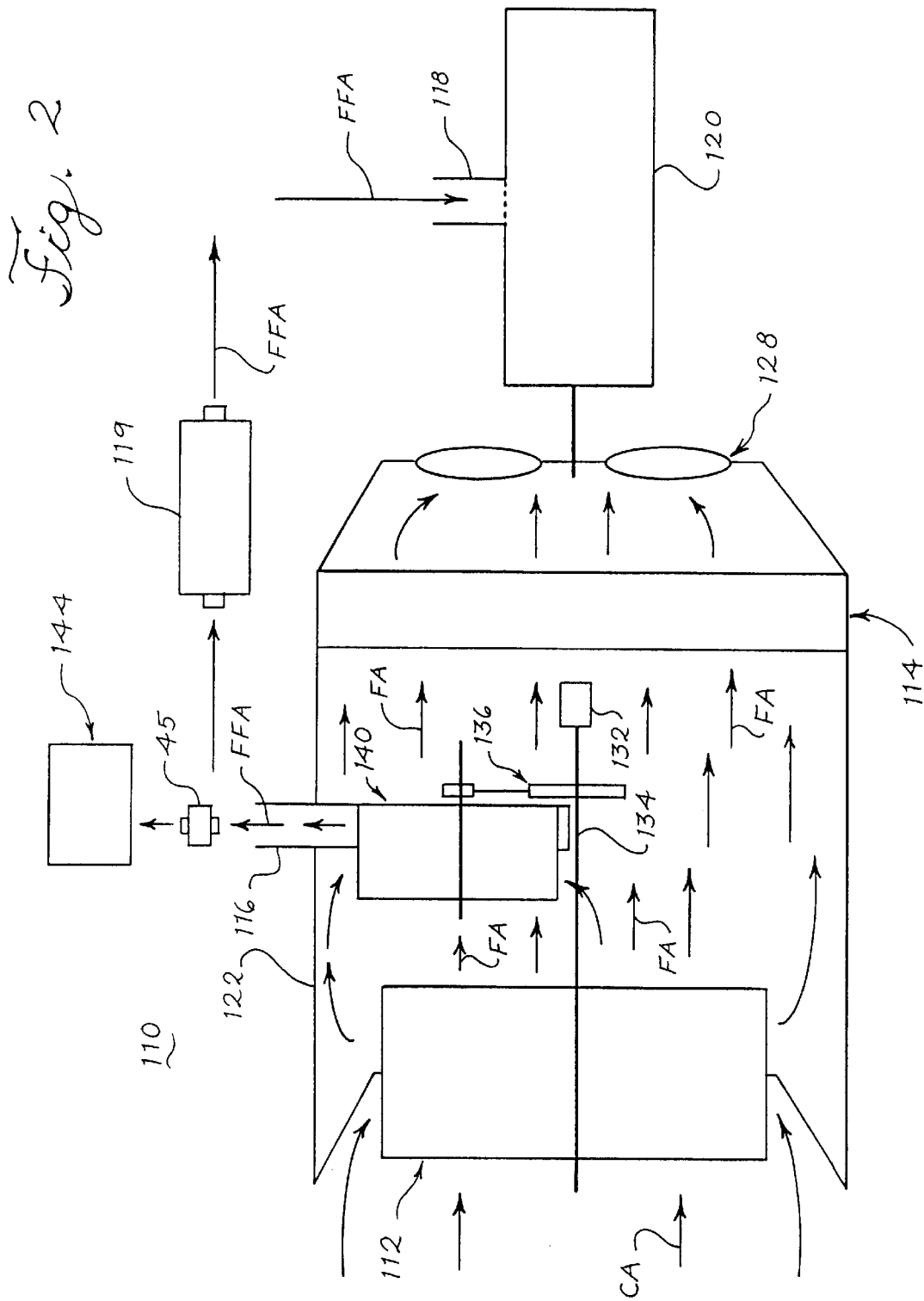

AIR CLEANING SYSTEM FOR VEHICLE COOLING SYSTEM AND ENGINE AND CAB

FIELD OF THE INVENTION

The invention generally relates to an air cleaning system for use in vehicles exposed to air-borne contaminants. More specifically, the invention relates to an air cleaning system to simultaneously filter air entering the vehicle cooling system, engine and cab.

BACKGROUND OF THE INVENTION

Off-road vehicles including construction and agricultural machinery are commonly operated in an environment with high levels of air-borne contaminants. Harvesting machines, such as cotton, sugar cane, grain and forage harvesters are typically operated in environments with various straw, seeds, dust and other air-borne contaminants. These machines are accordingly fitted with expensive air filters to protect the engine. In some machines, for example, a typical paper air filter may have a 15 inch diameter and a length of 2 feet.

These machines are also typically equipped with precleaners, which aid in removing some of the air contaminants entering the engine. However, the precleaners are only about 70%–90% efficient. Accordingly, a percentage of the contaminants are constantly entering the paper air filter and shortening the life of the filter.

The typical off-road vehicle also has a cooling system which may include an oil cooling system, a fuel cooling system, an air conditioner condenser, a radiator, and a charge air cooler. A self-cleaning rotary screen is typically used to keep out most large air contaminants from entering the cooling system. On occasion, however, the radiators and other cooling systems may become clogged due to larger particles passing through or around the seal of the rotary screen.

Air contaminants may also penetrate the interior cab of these machines through fresh air vents. As a result, paper filters are used to filter outside air as it passes through the vents. However, these filters occasionally become clogged due to excessive amounts of contaminants passing through the filters.

Accordingly, it would be desirable to have a vehicle air cleaning system which would efficiently operate to provide clean air to the cooling system, engine, and cab to extend the life of the paper filters and engine, and to reduce down time due to overheating caused by cooling system clogs.

SUMMARY OF THE INVENTION

One aspect of the invention provides an air cleaning system for a vehicle comprising an inertial separator for filtering contaminated air which then enters a vehicle cooling system positioned to receive the filtered air exiting from the inertial separator, and a clean air bleed conduit positioned to receive a portion of the filtered air and to direct the portion of filtered air to an engine and/or cab. The system may further include a second inertial separator communicating with the filtered air to further filter the filtered air to the engine. Both of the inertial separators may be driven via a single drive shaft, and may be powered by a hydraulic motor. The second inertial separator is preferably operated at a higher speed through a pulley arrangement operatively connected to the drive shaft. Preferably a transition shroud is positioned adjacent the inertial separator to receive the filtered air exiting from the inertial separator. Preferably the bleed conduit, which may include a tube, communicates with the shroud to direct the further filtered air to the engine. The air cleaning system may be used on a harvesting machine.

A further aspect of the invention provides a method of cleaning air for a vehicle. An inertial separator and a filtered air bleed conduit are provided. Contaminated air is flowed through the inertial separator. The contaminated air is filtered within the inertial separator. Filtered air is then flowed into a vehicle cooling system. A portion of the filtered air is then bled off to an engine and/or cab. The method further provides for a second inertial separator in communication with the filtered air. The filtered air is flowed through the second inertial separator to further filter the air, which is then directed to the engine and/or cab. Both inertial separators may be driven with a single drive shaft and the second inertial separator driven at higher speed via the pulley arrangement.

A further aspect of the invention provides for an air cleaning system for a vehicle comprising a first inertial separator which receives contaminated air and filters the air for entry into a vehicle cooling system, a drive shaft operably connected to the first inertial separator and a second inertial separator operably connected to the drive shaft via a pulley arrangement to allow the second inertial separator to operate at a higher speed than the first inertial separator to further filter the air which enters a vehicle engine and/or cab. The system may further comprise a hydraulic motor operably connected to the drive shaft, and may be used on a harvesting machine. The second inertial separator may be positioned within the shroud.

A further aspect of the invention provides for a method of cleaning air for a vehicle cooling system and engine and/or cab. A first inertial separator operably connected to a drive shaft and a second inertial separator operably connected to the drive shaft via an pulley arrangement are provided. Contaminated air is flowed through the inertial separator. The contaminated air is filtered within the inertial separator. The filtered air is then flowed into a vehicle cooling system. The drive shaft is rotated to operate the first inertial separator at a first speed, while simultaneously operating the second inertial separator via the pulley arrangement at a higher speed than the first speed. The filtered air is further filtered within the second inertial separator. The further filtered air is flowed into an air intake of an engine and/or cab. The pulley arrangement preferably has a ratio of, for example, at least about 1.25 to 1. Accordingly, the second inertial separator operated at a speed of at least 1.25 times as fast as the first inertial separator.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a schematic view of an alternative preferred embodiment of an air cleaning system made in accordance with the invention.

DETAILED DESCRIPTION OF THE PRESENTLY PREFERRED EMBODIMENTS

Figure 1:
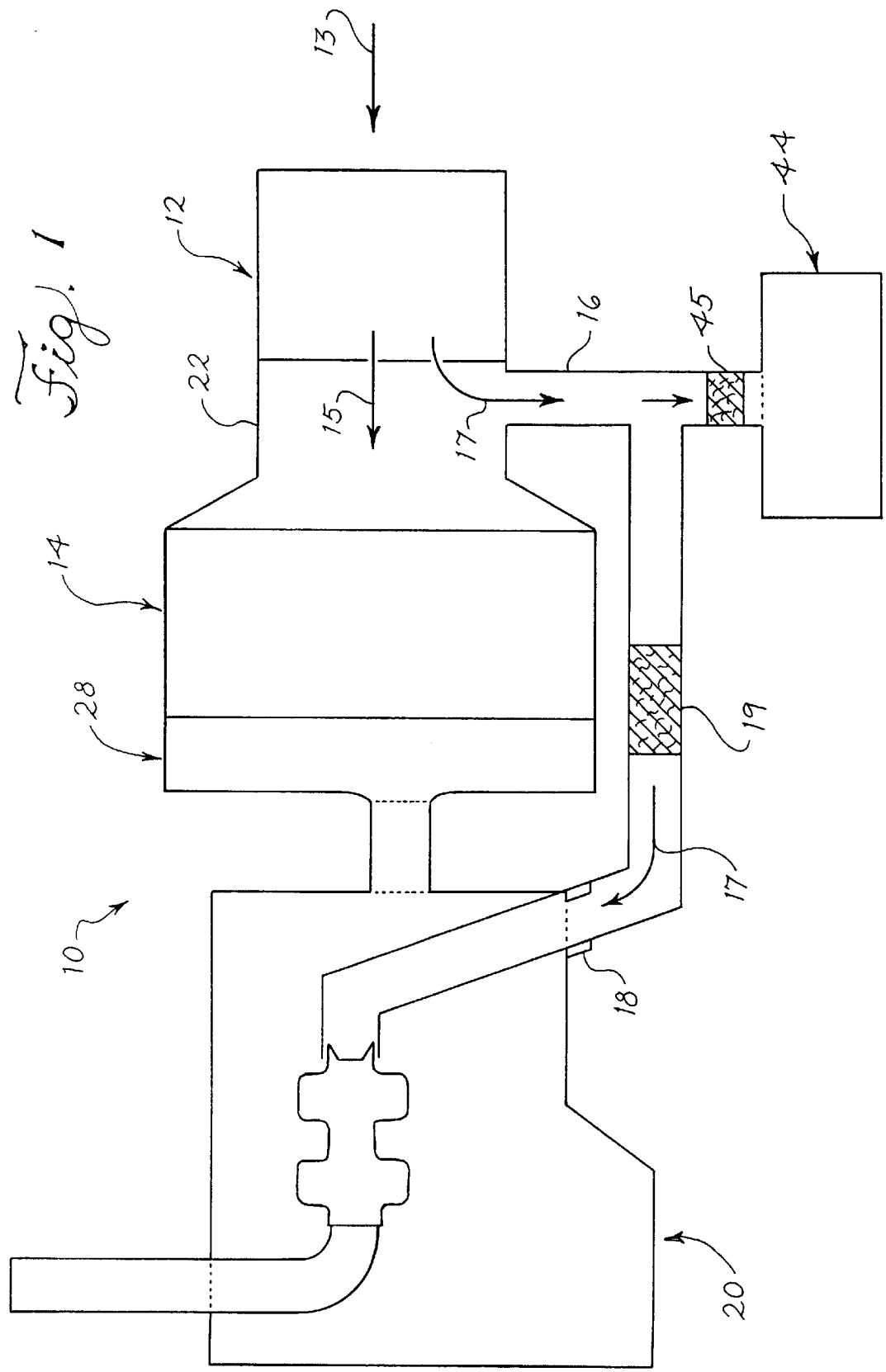
FIG. 1 is a schematic view of a preferred embodiment of an air cleaning system made in accordance with the invention.

Referring to FIG. 1, a preferred embodiment of the air cleaning system 10 for a vehicle comprises an inertial separator 12 for filtering contaminated air 13, which then enters a cooling system 14 positioned to receive the filtered air 15 exiting from the inertial separator 12. A clean air bleed conduit 16 is positioned to receive a portion 17 of the filtered air and to direct the portion of filtered air to an engine 20 and/or cab 44.

The air cleaning system 10 may preferably be used in any vehicles which are exposed to air-borne contaminants, including off-road vehicles such as construction and agricultural vehicles. These vehicles may be harvesting machines, including, for example, those typically used as grain, cotton, sugar cane and forage harvesters. In these environments, the air-borne contaminants may affect the air quality within the cab 44, where the operator of the vehicle is located, as well as the quality of air to the cooling system 14 and engine 20.

The inertial separator 12 may be any of a number of inertial separators, such as those discussed in U.S. Pat. Nos. 3,720,045 and 3,993,463. Inertial separators are also commercially available from NKR Technology Ltd. U.K., for example. The inertial separator may preferably be a blade-type inertial separator. The inertial separator 12 may include a boost fan, or alternatively the boost fan may be located apart from the inertial separator. The engine fan 28 may act as the boost fan. The purpose of the boost fan is to overcome the pressure drop caused by the filtering process with the inertial separator 12. The blades within the inertial separator are pitched, which accelerate dust particles and other contaminants in the plane of the blade rotation and eject the particles back into the outside environment. The percentage of particle separation is determined in part by the size and rotational speed of the blades.

As shown in the embodiment of FIG. 1, a single inertial separator 12 may be appropriate in some vehicle applications, including off-road vehicles and harvesting machines, to separate dust particles and other contaminants which would otherwise enter cooling system 14, engine 20 and cab 44. Preferably, downstream of the inertial separator 12 is a transition shroud 22, which provides protection of the filtered air 15 exiting the inertial separator 12 and flowing into the cooling system 14 with engine fan 28. The cooling system 14 may have various configurations and may include, for example, an oil cooling system, a fuel cooling system, an air-conditioner condenser, a radiator, and a charge air cooler.

The bleed conduit 16 may preferably be a tube which communicates with the transition shroud 22 to bleed off a portion 17 of the filtered air 15 exiting the inertial separator 12 and direct the filtered air to the engine intake 18 and/or to the cab 44. Preferably, a paper filter 19 collects any fine particles which were not filtered by the inertial separator 12.

Referring now to FIG. 2, another embodiment of the air cleaning system is shown schematically at 110. The system 110 includes an inertial separator 112 is driven with a motor 132, which may be any of a variety of commercially available motors, including hydraulic and electric motors. In harvesting machines, for example, hydraulic motors may be preferable. The motor 132 rotates drive shaft 134 to operate the inertial separator 112. The blades of the inertial separator 112 should rotate at a speed sufficient to filter out any particles capable of clogging the cooling system.

A pulley arrangement 136 is preferably operatively connected between the drive shaft 134 and a second inertial separator 140. Preferably, as shown in FIG. 2, the pulley arrangement 136 is designed to increase the revolutions per minute (RPM) of the second inertial separator 140, for example, to at least about 1.25 times the RPM of the first inertial separator 112. The second inertial separator 140 is preferably smaller in size than the inertial separator 112 to provide optimum efficiency to further filter a portion of filtered air FA exiting the first inertial separator 112. Alternatively, the second inertial separator 140 may be driven by a second drive shaft. The second inertial separator 140 may be positioned within the transition shroud 122. The bleed conduit 16 or tube may direct the further filtered air FFA exiting the second inertial separator 40 to the engine air intake 118 and/or to the cab 144. As shown, the paper filter 119 is positioned in the path of the further filtered air FFA leading to the engine 120, and the paper filter 145 is positioned in the path leading to the cab 144. The increased speed of the second inertial separator 40 allows for high percentages of particle separation, and provides cleaner air for entry into the engine 120. This further filtering aids in extending the life of the air filter 119 and ultimately the engine life. The engine 120 drives the fan 128.

The size and operating speeds of the first and second inertial separators 112, 140 are application specific. Preferably, the first inertial separator 112 is sized and operated at speeds sufficient to remove contaminants from the incoming contaminated air CA which may act to clog the cooling system 114. In some applications, it may be necessary to utilize more energy to run the single inertial separator embodiment of FIG. 1 because of the need to sufficiently clean a large volume of air for the cooling system while simultaneously achieving the higher level of filtering necessary for the air directed to the engine and/or cab. Energy efficiencies may be achieved by using the two inertial separator embodiment of FIG. 2. In the embodiment of FIG. 2, a pulley arrangement may then be set at an appropriate ratio, for example, 1.5 to 1, to operate the smaller inertial separator 140 at a higher RPM than the first inertial separator 112, thus maximizing the efficiency of the cleaning system, while also maximizing the percentage of particle separation to provide a high quality of air to the engine 120. The pulley ratio may alternatively be set at any ratio to achieve the maximum efficiencies and separation required for the application.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. An air cleaning system for a vehicle, comprising:
    a) an inertial separator including rotating blades for separating dust particles and other contaminants which are flowed through it to provide a filtered air output;
    b) a passage for receiving said filtered air output and delivering a portion of it to a vehicle cooling system; and
    c) means connected to said passage for delivering another portion of said filtered air to at least one of an engine or cab in the vehicle.

2. The system of claim 1 further comprising:
    a second inertial separator;
    said second inertial separator being downstream of said first inertial separator and adapted to receive said other portion of filtered air and further filter it before it is delivered to at least one of said engine or cab.

3. The system of claim 2, wherein both inertial separators are driven via a single drive shaft.

4. The system of claim 3, wherein the drive shaft is driven with a hydraulic motor.

5. The system of claim 3, wherein the second inertial separator is operated at a higher speed through a pulley arrangement operatively connected to the drive shaft.

6. The system of claim 1, further comprising a shroud positioned adjacent the inertial separator to receive the filtered air exiting the inertial separator.

7. A method of cooling air for use in a vehicle cooling system, comprising the steps of:
   a) introducing contaminated intake air to an inertial separator;
   b) employing the inertial separator to filter contaminants from the air as it passes through the separator;
   c) directing filtered air into the vehicle cooling system; and
   d) also directing filtered air into at least one of an air engine compartment and a cab on the vehicle.

8. The method of claim 7, further comprising:
   providing a second inertial separator in communication with the filtered air; and
   flowing the filtered air through the second inertial separator to further filter the air.

9. The method of claim 8, further comprising:
   providing a pulley arrangement operatively connected with a drive shaft;
   driving both inertial separators with the drive shaft; and
   driving the second inertial separator at a higher speed via the pulley arrangement.

10. An air cleaning system for a vehicle comprising:
    a first dynamic inertial separator which receives contaminated air and filters the air for entry into a vehicle cooling system;
    a drive shaft operatively connected to drive the first inertial separator;
    a second inertial separator operatively connected to the drive shaft via a pulley arrangement to allow the second inertial separator to operate at a higher speed than the first inertial separator to further filter the air which enters a vehicle engine and/or cab.

11. The system of claim 10, further comprising a hydraulic motor operatively connected to the drive shaft.

12. The system of claim 10, wherein the vehicle comprises a harvesting machine.

13. The system of claim 10, further comprising a shroud positioned adjacent the first inertial separator for distributing the filtered air exiting the inertial separator.

14. The system of claim 13, wherein the second inertial separator is positioned within the shroud.

15. The system of claim 10, further comprising a diverter for directing the further filtered air exiting the second inertial separator to the engine and/or cab.

16. A method of cleaning air for a vehicle comprising:
    providing a first inertial separator operatively connected to a drive shaft, and a second inertial separator operatively connected to the drive shaft via a pulley arrangement;
    flowing contaminated air through the first inertial separator;
    filtering the contaminated air within the first inertial separator;
    flowing the filtered air into a vehicle cooling system;
    rotating the drive shaft to operate the first inertial separator at a first speed, while simultaneously operating the second inertial separator via the pulley arrangement at a higher speed than the first speed;
    further filtering the filtered air within the second inertial separator; and
    flowing the further filtered air into an air intake of an engine and/or cab.

17. The method of claim 16, wherein the pulley arrangement has a ratio of at least about 1.25 to 1; operating the second inertial separator at a speed at least 1.25 times as fast as the first inertial separator.

* * * * *